United States Patent [19]

Hino et al.

[11] Patent Number: 4,879,550
[45] Date of Patent: Nov. 7, 1989

[54] METHOD AND SYSTEM FOR LOOP COMMUNICATION

[75] Inventors: Yusuke Hino; Tohru Horimoto; Hideaki Gemma; Toshiharu Iwata; Kimitoshi Yamada, all of Hadano, Japan

[73] Assignee: Hitachi, Ltd., Tokyo, Japan

[21] Appl. No.: 871,995

[22] Filed: Jun. 9, 1986

[30] Foreign Application Priority Data

Jun. 19, 1985 [JP] Japan .............................. 60-133289

[51] Int. Cl.⁴ ........................... H04Q 3/00; H04J 3/00
[52] U.S. Cl. ........................... 340/825.050; 370/85.12
[58] Field of Search ...................... 340/825.05, 825.01; 370/86, 88

[56] References Cited

U.S. PATENT DOCUMENTS

| | | | |
|---|---|---|---|
| 3,710,026 | 1/1973 | Graham et al. | 370/88 |
| 3,731,002 | 5/1973 | Pierce | 370/88 |
| 4,596,982 | 6/1986 | Bahr et al. | 340/825.05 |
| 4,597,078 | 6/1986 | Kempf | 370/88 |
| 4,621,362 | 11/1986 | Sy | 370/88 |
| 4,627,052 | 12/1986 | Hoare et al. | 370/88 |
| 4,680,756 | 7/1987 | Sugimoto et al. | 370/88 |

Primary Examiner—Donald J. Yusko
Assistant Examiner—Brian Palladino
Attorney, Agent, or Firm—Antonelli, Terry & Wands

[57] ABSTRACT

A composite loop communication network formed by combining a plurality of loop communication paths each provided with terminals with one another through a plurality of loop coupling devices so as to form a loop, is disclosed in which one of the terminals of each loop communication path is used as a management terminal, the management terminal of a loop communication path sets routing information on the communication between the loop communication path and a loop communication path adjacent thereto in a loop coupling device, and the loop coupling device selectively takes in data flowing through the former loop communication path, on the basis of the above routing information, to send the data from the loop coupling device to the latter loop communication path, thereby making possible the communication between terminals of different loop communication paths.

9 Claims, 3 Drawing Sheets

METHOD AND SYSTEM FOR LOOP COMMUNICATION

BACKGROUND OF THE INVENTION

The present invention relates to a method for loop communication, and more particularly to a communication method for operating a plurality of loop communication paths as a composite loop communication network.

In the prior art, a plurality of loop communication paths are combined with one another, for example, by a method disclosed in Japanese patent application Unexamined Publication No. 58-116837. In this method, a plurality of loop communication paths are combined with one another through a loop coupling device, and the loop coupling device takes in a frame (namely, the transmission unit of data) whose destination loop is different from the sending loop of the frame, to send the frame to the destination loop. Further, in a case where the communication between the loop coupling device and the destination loop is made impossible by a fault, or the destination loop is in a busy condition, the loop coupling device informs a terminal which has made a call request, that the communication with the destination loop is impossible.

As mentioned above, in the conventional method, a plurality of loop communication paths are combined with one another so that the communication between terminals of different loops is made without taking the routing control into consideration. That is, attention is not paid to the routing control that, when a plurality of communication routes exist between two terminals, an optimum route is selected by taking into consideration a busy condition and the position of a fault. Further, in the conventional method, a plurality of loop communication paths are combined with one another through only one loop coupling device, and hence no attention is paid to a system in which a plurality of loop communication paths are combined with one another through a plurality of loop coupling devices so as to operate as a loop communication network, and an optimum one of a plurality of possible communication routes between two terminals can be dynamically determined by taking into consideration the busy condition and the presence of any fault in the communication routes.

In a case where such a loop communication network (that is, a composite loop system) is formed by combining a plurality of loop communication paths organically, it is an important problem how efficiently the routing control is carried out for the communication between two terminals which are connected to different loops.

SUMMARY OF THE INVENTION

It is an object of the present invention to provide a communication method and a communication system, in both of which a plurality of loop communication paths are combined with one another so as to operate as one loop communication network.

In order to attain the above object, according to the present invention, a plurality of loop communication paths are combined with one another through a plurality of loop coupling devices in such a manner that each of the loop communication paths is provided with a management terminal for setting the routing control information about output directions in a loop coupling device, and thus it is possible to efficiently carry out the routing control for the communication between different loop communication paths in a state that each of transmitting and receiving terminals is unconscious of the routing control, thereby operating all the loop communication paths as a composite loop communication network.

DESCRIPTION OF THE PREFERRED EMBODIMENT

The present embodiment will be explained below in detail, on the basis of the depicted embodiment thereof.

Figure 1:
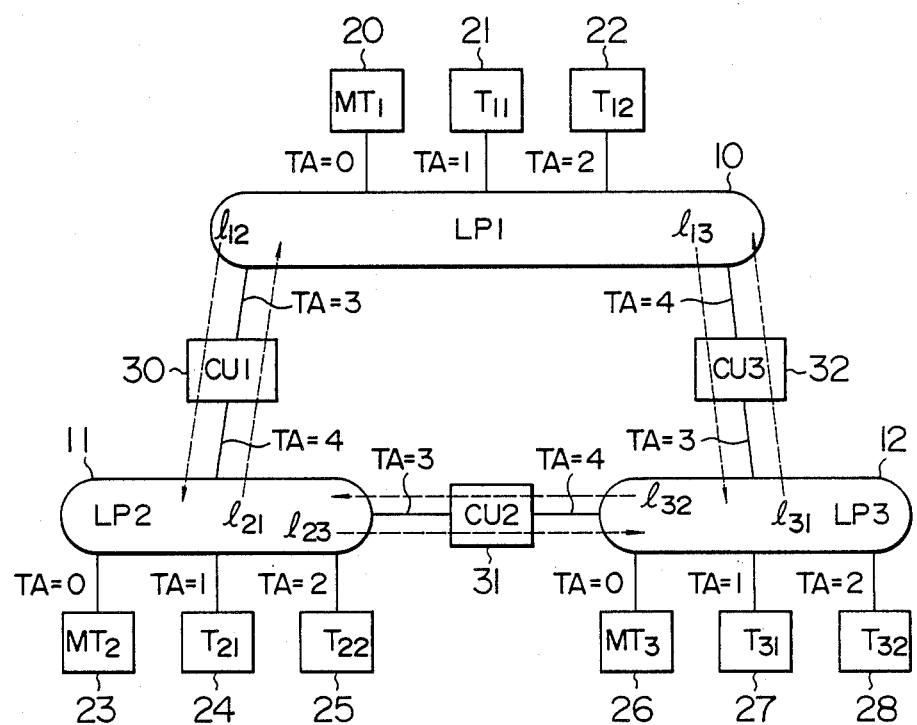
FIG. 1 a block diagram showing an embodiment of a composite loop communication network according to the present invention.

FIG. 1 shows an embodiment of a composite loop communication network according to the present invention. Referring to FIG. 1, three loop communication paths (hereinafter simply referred to as "loops"), that is, the first loop (LP1) 10, the second loop (LP2) 11 and the third loop (LP3) 12 are combined into a composite loop communication network with the aid of three loop coupling devices, that is, the first coupling device (CU1) 30, the second coupling device (CU2) 31 and the third coupling device (CU3) 32. Further, in FIG. 1, reference numerals 21 and 22 designate data terminals ($T_{11}$ and $T_{12}$) connected to the first loop 10, reference numerals 24 and 25 identify data terminals ($T_{21}$ and $T_{22}$) connected to the second loop 11, reference numerals 27 and 28 identify data terminals ($T_{31}$ and $T_{32}$) connected to the third loop 12, and reference numerals 20, 23 and 26 identify management terminals ($MT_1$, $MT_2$ and $MT_3$) respectively connected to the first, second and third loops for setting routing control information necessary for the routing control in the first, second and third coupling devices 30 to 32.

Figure 2:
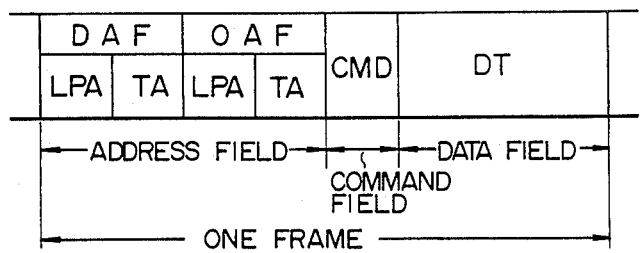
FIGS. 2 (a) and (b) are schematic diagrams showing an example of the structure of a frame flowing through the communication network of FIG. 1.

Part (a) of FIG. 2 shows the frame structure of data information flowing between terminals, and part (b) of FIG. 2 shows the data field of part (a) of FIG. 2 in a case where routing control information is transmitted by using the frame structure of part (a) of FIG. 2. In other words, part (b) of FIG. 2 shows address information which is necessary for the routing control and is sent from a management terminal to one of the first, second and third coupling devices 30 to 32. In part (a) of FIG. 2, reference symbol DAF designates a destination address field for indicating the destination address of the frame, OAF an origin address field for indicating the address of the sending source of the frame, LPA a loop address, TA a terminal address, CMD a command field which contains a control code for specifying the request/response between terminals, and DT a data field for storing additional information which indicates the contents of the control code. The control code is, for example, an instruction code for using the output function or the filing function of each terminal.

Next, explanation will be made of a routing control which is made by the management terminals 20, 23 and 26 and the loop coupling devices 30 to 32 of FIG. 1.

The setting procedure of routing control information with respect to a route $l_{12}$ from the first loop 10 to the second loop 11 will first be explained. The management terminal 20 sends the routing control information with respect to the route $l_{12}$ to the first coupling device 30 by using the frame structure of part (a) of FIG. 2. That is, the address of the first coupling device 30 (that is, LPA=1, TA=3) is set in the destination address field DAF, the address of the management terminal 20 (that is, LPA=1, TA=0) is set in the original address field OAF, a control code for specifying a routing control is set in the command field CMD, and destination address via the route $l_{12}$ are set in the data field DT. Part (b) of FIG. 2 shows how the destination addresses are set in the data field. For example, in a case where the address of the data terminal 24 (that is, LPA=2, TA=1) is set in the first region DAF1, the address of the data terminal 25 (that is, LPA=2, TA=2) is set in the second region DAF2, and the address of the management terminal 23 (that is, LPA=2, TA=0) is set in the third region DAF3, it is indicated that only the frames flowing through the first loop 10 which are addressed to one of the terminals 23, 24 and 25, can pass through the route $l_{12}$. In other words, the first coupling device 30 sends only the frame addressed to one of the terminals 23 to 25 which are connected to the second loop 11, to the second loop 11, and returns other frames to the first loop 10.

Next, the setting procedure of routing control information with respect to a route $l_{13}$ from the first loop 10 to the third loop 12, will be explained.

The routing control information frame with respect to the route $l_{13}$ which is to be sent from the management terminal 20 to the third coupling device 32, is formed in such a manner that the address of the third coupling device 32 (that is, LPA=1, TA=4) is set in the destination address field DAF, the address of the management terminal 20 (that is, LPA=1, TA=0) is set in the origin address field OAF, the control code for specifying a routing control is set in the command field CMD, the address of the data terminal 27 (that is, LPA=3, TA=1) is set in the first region DAF1 of the data field DT, the address of the data terminal 28 (that is, LPA=3, TA=2) is set in the second region DAF2 of the data field DT, and the address of the management terminal 26 (that is, LPA=3, TA=0) is set in the third region DAF3 of the data field DT. When the routing control information with respect to the route $l_{13}$ is set in the third coupling device 32 by the above routing control information frame, only the frames flowing through the first loop 10 which are addressed to one of the terminals 26, 27 and 28 can pass through the route $l_{13}$.

The routing control information with respect to each of routes $l_{21}$, $l_{23}$, $l_{31}$ and $l_{32}$ can be set in a loop coupling device in the same manner as mentioned above. That is, information indicating a routing condition that, of frames flowing through the second loop 11, only the frame addressed to one of the terminals 20, 21 and 22 can be sent from the second loop 11 to the first loop 10, is set, as the routing control information with respect to the route $l_{21}$, in the first coupling device 30 by the management terminal 23, and information indicating a routing condition that, of frames flowing through the second loop 11, only the frame addressed to one of the terminals 26, 27 and 28 can be sent from the second loop 11 to the third loop 13, is set, as the routing control information with respect to the route $l_{23}$, in the second coupling device 31 by the management terminal 23. Further, information indicating a routing condition that, of frames flowing through the third loop 12, only the frame addressed to one of the terminals 20, 21 and 22 can be sent from the third loop 12 to the first loop 10, is set, as the routing control information with respect to the route $l_{31}$, in the third coupling device 32 by the management terminal 26, and information indicating a routing condition that, of frames flowing through the third loop 12, only the frame addressed to one of the terminals 23, 24 and 25 can be sent from the third loop 12 to the second loop 11, is set, as the routing control information with respect to the route $l_{32}$, in the second coupling device 31 by the management terminal 26.

As mentioned above, each of the management terminals 20, 23 and 26 sets the routing information with respect to output directions, in those two of the loop coupling devices 30, 31 and 32 which are connected to a loop having the management terminal. Thus, each of the loop coupling devices 30, 31 and 32 can take in a frame which is to be transferred between two of the loops 10, 11 and 12, to send the frame to a desired terminal. That is, routing control can be made in the composite loop communication network.

Usually, routing control information which is previously registered in the management terminals 20, 23 and 26, is set in the loop coupling devices 30, 31 and 32, when the power supply circuits of these management terminals are turned on. However, taking into consideration the occurrence of fault and the busy condition of a communication route, routing control information can also be set in the loop coupling devices 30 to 32 at any time by the management terminals 20, 23 and 26 on the basis of the operator's indication.

Figure 3:
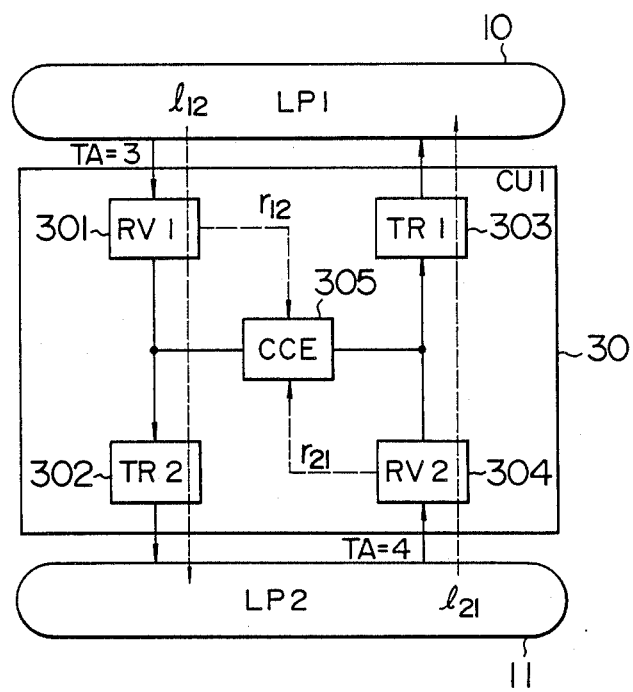
FIG. 3 is a block diagram showing the circuit configuration of an example of each loop coupling device of FIG. 1.

FIG. 3 shows the circuit configuration of an example of the first coupling device 30. The second and third coupling devices 31 and 32 also have the same circuit configuration as shown in FIG. 3.

Referring to FIG. 3, routing control information which is sent from the management terminals 20 and 23 to the first coupling device 30, is given to a coupling control element (CCE) 305 through control lines $r_{12}$ and $r_{21}$, to be stored in the coupling control element 305. That is, the routing processing of the first coupling device 30 is carried out by the coupling control element 305, which is usually controlled by a microcomputer according to a stored program. In more detail, the coupling control element 305 holds the routing conditions with respect to the routes $l_{12}$ and $l_{21}$. When frames flowing through the first loop 10 are received by the first receiving circuit (RV1) 301, the coupling control element 305 sends only a frame satisfying the routing condition with respect to the route $l_{12}$, to the second loop 11 through the second transmitting circuit (TR2) 302, and returns frames incapable of satisfying the above routing condition to the first loop 10 through the first transmitting circuit (TR1) 303, that is, through the first coupling device (CU1) to cause such frames to again flow through the first loop 10. Further, when frames flowing through the second loop 11 are received by the second receiving circuit (RV2) 304, the coupling control element 305 sends only a frame satisfying the routing condition with respect to the route $l_{21}$ to the first loop 10 through the first transmitting circuit 303, and returns frames incapable of satisfying this routing condition to the second loop 11 through the second transmitting circuit 302, that is, through the first coupling device (CU1), to cause such frames to again flow through the second loop 11.

As mentioned above, frames flowing through the first and second loops 10 and 11 are checked by the coupling control element 305 of the first coupling device 30 on the basis of the routing control information set in the element 305, and one of the route from the first receiving circuit 301 to the second transmitting circuit 302 and the route from the second receiving circuit 304 to the first transmitting circuit 303 is activated by the coupling control element 305 only when a frame satisfying the routing condition with respect to the route $l_{12}$ or $l_{21}$ is received by the first coupling device 30. The second and third coupling devices 31 and 32 perform an operation similar to the above operation of the first coupling device 30.

Figure 4:
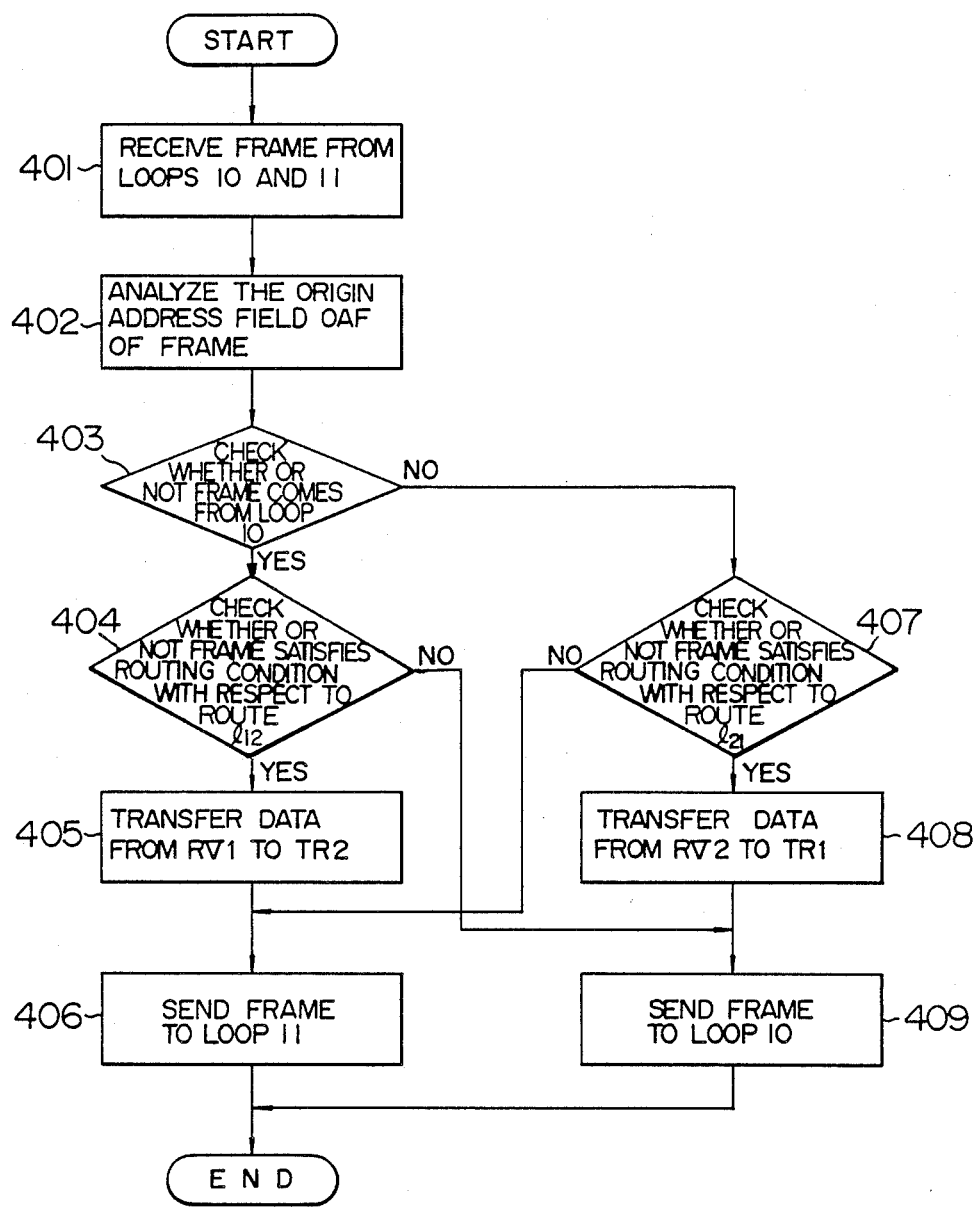
FIG. 4 is a flow chart for explaining the operation of the coupling control element (CCE) of FIG. 3.

FIG. 4 is a flow chart showing the control operation of the coupling control element 305 of the first coupling device 30. Referring to FIG. 4, when a frame flowing through one of the first and second loops 10 and 11 is received by the coupling control element 305 in step 401, the coupling control element 305 analyzes the origin address field OAF of the frame (step 402), and it is checked in step 403 whether or not the frame comes from the first loop 10. When the frame is judged to come from the first loop 10, it is checked in step 404 whether the frame satisfies the routing condition with respect to the route $l_{12}$. When the frame satisfies the above condition, data is transferred from the first receiving circuit 301 to the second transmitting circuit 302 (step 405), and the frame is sent to the second loop 11 (step 406). When the frame does not satisfy the routing condition with respect to the route $l_{12}$, the frame is returned to the first loop 10 (step 409). Further, when the frame is judged to come from the loop 11, it is checked in step 407 whether or not the frame satisfies the routing condition with respect to the route $l_{21}$. When the frame satisfies the above condition, data is transferred from the second receiving circuit 304 to the first transmitting circuit 303 (step 408), and the frame is sent to the first loop 10 (step 409). When the frame does not satisfy the routing condition with respect to the route $l_{21}$, the frame is returned to the second loop 11 (step 406).

As mentioned above, the management terminals are used for setting the routing information with respect to output directions in the loop coupling devices, and thus routing control can be made for all the terminals connected to the composite loop communication network. In more detail, when a sending terminal specifies the loop address and station address of a destination terminal, data from the sending terminal is sent to the destination terminal through a route which is determined by the loop coupling devices, and thus a terminal of a loop can communicate with a terminal of another loop without being conscious of the routing operation (namely, the route selection).

Next, explanation will be made of a route changing method in a case where the communication using the route $l_{12}$ which passes through the first coupling device 30, has become impossible, by way of example.

First, the management terminal 20 requests the management terminal 26 of the third loop 12 to set a new route. That is, the management terminal 20 requests the management terminal 26 to add the communication with the terminals 23, 24 and 25 to the routing condition with respect to the route $l_{32}$, by using the route $l_{13}$. (It is to be noted that, in the foregoing explanation of the present embodiment, the communication from the third loop 12 to the terminals 23, 24 and 25 is included in the routing condition with respect to the route $l_{32}$. Therefore, the above request is sent from the management terminal 20 to the management terminal 26, when the routing condition with respect to the route $l_{32}$ does not include the communication with the terminals 23, 24 and 25). Thereafter, the management terminal 20 instructs the first coupling device 30 to clear the routing condition with respect to the route $l_{12}$ and to close this route $l_{12}$, and then changes the routing condition with respect to the route $l_{13}$ which is set the third coupling device 32, so that the frame addressed to one of the terminals 23, 24 and 25 can pass through the route $l_{13}$.

That is, a route different from an ordinary route is opened, and thus data can be sent from a terminal of the first loop 10 to a terminal of the second loop 11 through the routes $l_{13}$ and $l_{32}$.

As mentioned above, desired routing control information can be dynamically sent from a management terminal to two of the loop coupling devices 30, 31 and 32, and hence the communication route between terminals of different loops can be readily altered when a fault has occurred.

In the foregoing, the circuit configuration and the operation of the present embodiment have been explained in detail. However, the function of a management terminal ($MT_m$) shown in FIG. 1 may be performed by a data terminal ($T_n$) of a loop, to which the management terminal is connected.

As has been explained in the foregoing, according to the present invention, a plurality of loop communication paths can operate as a composite loop communication network by setting loop coupling information in a plurality of coupling devices. Thus, the communication between terminals of different loops is made possible, and dynamic alteration of the route between these terminals can be readily carried out by changing the loop coupling information set in the loop coupling devices. Further, since the communication between terminals of different loops is possible, the output function and filing function of a terminal can be utilized by many other terminals. That is, it is possible to make efficient use of the resources (for example, a printer and a disc) connected to the composite loop communication network.

We claim:

1. A loop communication system, comprising a plurality of loop communication paths interconnected through loop coupling devices, each loop communication path having a first message terminal for sending a first message frame including routing information and at least one second terminal for sending and receiving a second message frame on said loop communication paths; and each of said loop coupling devices including means responsive to said first message frame received from a loop communication path for storing routing information carried by said first message frame for controlling the transfer of second message frames between the loop communication paths connected thereto, means for receiving a second message frame from a loop communication path, and means for selectively sending a received second message frame from one loop communication path to another or back to said one loop communication path on the basis of said stored routing information.

2. A loop communication system according to claim 1, wherein at least one loop communication path is connected through respective coupling devices to at least two other loop communication paths.

3. A loop communication system according to claim 2, wherein said first message terminal in each loop communication path includes means for generating a first message frame having a destination address identifying a loop coupling device and routing information to be stored in the identified loop coupling device.

4. A loop communication system according to claim 3, wherein said routing information includes information on the destination and the sending source of a second message frame to be sent.

5. A loop communication system according to claim 1, wherein said first message terminal in each loop communication path includes means for generating a first message frame having a destination address identifying a loop coupling device and routing information to be stored in the identified loop coupling device.

6. A loop communication system according to claim 1, wherein said routing information includes information on the destination and the sending source of a second message frame to be sent.

7. A loop communication system, comprising first and second loop communication paths, each loop communication path having a plurality of terminals connected to one another to form a loop, each terminal including means for generating a message frame having a destination address and data to be transmitted to another terminal having that destination address; and a loop coupling device interconnecting said first and second loop communication paths and having means for receiving a routing message frame having a destination address identifying said loop coupling device and routing information in the form of at least one terminal address of a terminal connected to said second loop communication path, means for storing said routing information, means for receiving a message frame from said first loop communication path, and means for selectively sending said received message frame to said second loop communication path or back to said first loop communication path on the basis of whether or not the received message frame includes a destination address corresponding to a terminal address stored in said storing means.

8. A loop communication system according to claim 7, wherein at least one of said first and second loop communication paths has connected thereto a terminal including means for generating a routing message frame and means for sending said routing message frame to said loop coupling device.

9. A loop communication system according to claim 7, further including a third loop communication path and additional loop coupling devices, said first, second and third loop communication paths being connected to each other through said loop coupling devices to form a loop network.

* * * * *